UNITED STATES PATENT OFFICE.

HOLDON M. ASHBY, OF CHICAGO, ILLINOIS, ASSIGNOR TO THE SHERWIN-WILLIAMS COMPANY, OF CLEVELAND, OHIO, A CORPORATION OF OHIO.

PRIMER AND SEALER.

1,164,324.  Specification of Letters Patent.  Patented Dec. 14, 1915.

No Drawing.  Application filed July 21, 1914.  Serial No. 852,307.

*To all whom it may concern:*

Be it known that I, HOLDON M. ASHBY, a citizen of the United States, and a resident of Chicago, county of Cook, and State of Illinois, have invented a new and useful Improvement in Primers and Sealers, of which the following is a specification, the principle of the invention being herein explained and the best mode in which I have contemplated applying that principle, so as to distinguish it from other inventions.

The present invention relates to a composition of matter which is intended for use as a primer or sealer on woods such as yellow pine which are so impregnated with pitch that it is difficult to make paint stick to the same.

It has been a problem of considerable difficulty to properly apply paint to pine in view of the amount of pitch contained in this wood, which prevents the paint from penetrating under the surface of this wood, and causes it to crack and peel off.

My invention effectually prepares the wood for the application of the paint and entirely prevents peeling and cracking of the paint from the wood when dry. This desired result is accomplished by the action of my composition on the pitch, the latter being softened and dissolved by my composition when applied to the surface of the wood, thus rendering yellow pine as capable of receiving and holding a paint as ordinary woods which do not contain the same amount of the troublesome pitch.

To the accomplishment of the foregoing and related ends, said invention, then, consists, of the ingredients hereinafter fully described and particularly pointed out in the claims.

The following description sets forth in detail certain ingredients constituting the composition embodying the invention, such combined ingredients constituting, however, but one of various forms in which the principle of the invention may be used.

In my improved composition I use a quantity of some hard gum, such for example as Kauri gum, to which I add a small quantity of a suitable drying oil, preferably linseed oil, and a minute quantity of litharge or an equivalent drying agent. These ingredients are first mixed together and then suitably treated under heat. The resulting mixture is then dissolved in a suitable volatile solvent such for example as benzole, toluol or acetone.

This composition possesses the property of dissolving without the use of heat, the pitch which is to be found in the wood being treated, thus preparing the wood for the application of the paint and entirely preventing the peeling or cracking of the paint.

It will be understood that the particular ingredient selected from each group of equivalently acting substances is not a matter of prime importance, although for commercial reasons I preferably employ the following ingredients in the proportions by weight as stated. My improved composition is preferably made up of 20% of Kauri gum, 5% of linseed oil and ½ of 1% of litharge dissolved in 74.95% of toluol. I do not limit the composition to these exact proportions nor ingredients. Thus the drying agent may be omitted in certain cases without destroying the beneficial results secured by the use of the composition. Any desired coloring material may be added to the composition when required.

The present invention serves a distinct need in the preparation of yellow pine for painting. No composition has heretofore been made which will effectively prepare yellow pine to receive and hold a coat of paint and the present composition has been found to entirely prevent the harmful action of the pitch.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. A composition of matter, comprising a hard gum and a drying oil, dissolved in a solvent therefor, substantially in the proportions described.

2. A composition of matter, comprising a hard gum, a drying oil and a drying agent, dissolved in toluol, substantially in the proportions described.

3. A composition of matter, comprising

Kauri-gum, a drying oil and drying agent, dissolved in toluol, substantially in the proportions described.

4. A composition of matter, comprising Kauri-gum, linseed oil, litharge and toluol, substantially in the proportions described.

5. A composition of matter, comprising approximately 20% by weight hard gum, a drying oil in small amount, a drying agent in smaller amount, and 75% of a solvent for said gum, oil and drying agent.

6. A composition of matter, comprising approximately 20% by weight hard gum, 5% of a drying oil, a smaller amount of a drying agent, and 75% of a solvent for said gum, oil and drying agent.

7. A composition of matter, comprising approximately 20% by weight hard gum, 5% of a drying oil, 1% of litharge, all dissolved in 75% of toluol.

Signed by me, this 9th day of July, 1914.

HOLDON M. ASHBY.

Attested by—
S. R. Fraser,
S. B. Evans.